United States Patent [19]

Feldmann et al.

[11] 4,164,557

[45] Aug. 14, 1979

[54] PROCESS FOR THE PRODUCTION OF β-LITHIUM ALUMINATE AND NEEDLE-SHAPED PRODUCT

[75] Inventors: Martin Feldmann, Hanau, Fed. Rep. of Germany; Edgar Koberstein, Alzenau, Austria; Klaus Seibold, Hanau, Fed. Rep. of Germany

[73] Assignee: Deutsche Gold- und Silber-Scheideanstalt vormals Roessler, Frankfurt, Fed. Rep. of Germany

[21] Appl. No.: 886,365

[22] Filed: Mar. 14, 1978

[30] Foreign Application Priority Data

Mar. 16, 1977 [DE] Fed. Rep. of Germany ....... 2711420

[51] Int. Cl.² .................................................. C01F 7/02
[52] U.S. Cl. ..................................... 423/600; 429/193
[58] Field of Search ......................... 423/600; 429/193

[56] References Cited

U.S. PATENT DOCUMENTS

| | | | |
|---|---|---|---|
| 3,859,427 | 1/1975 | Francis et al. | 423/600 |
| 3,878,296 | 4/1975 | Vine et al. | 423/600 |
| 3,998,939 | 12/1976 | Mason et al. | 423/600 |
| 4,029,755 | 6/1977 | Gazza et al. | 423/600 |

OTHER PUBLICATIONS

Horan et al., "Journal of American Chem. Soc.", vol. 57, pp. 2434–2436, 1935.

*Primary Examiner*—Herbert T. Carter
*Attorney, Agent, or Firm*—Beveridge, DeGrandi, Kline

[57] ABSTRACT

A process for the production of β-lithium aluminate $LiAlO_2$, is disclosed wherein a lithium hydroxide aluminate of the formula: $Li_2O \cdot Al_2O_3 \cdot nH_2O$ is precipitated from aqueous solutions which contain the lithium ions and aluminum in ionogenic or elementary form at a pH value above 7. The concentration of the two metal components is at least 0.1, at most 6 g-atoms per liter, preferably 2 to 5 g-atoms per liter. The precipitation product is washed and dried and then is converted by annealing into β-lithium aluminate, in the temperature range between 200° C. and 800° C., preferably 400° C.–650° C., and especially 450° C.–550° C. The β-$LiAlO_2$ obtained thereby has a lamellae-shaped or fine crystalline form which is converted into a needle-shaped, crystalline lithium aluminate, is obtained by the process of the invention and is suitable for the construction of electrolyte matrices.

14 Claims, 3 Drawing Figures

PROCESS FOR THE PRODUCTION OF β-LITHIUM ALUMINATE AND NEEDLE-SHAPED PRODUCT

The present invention relates to a process for the production of β-lithium aluminate which has the formula: $LiAlO_2$ and more particularly its conversion into a needle-shaped crystalline form. β-lithium aluminate serves as a starting material for electrolyte matrices in fuel cells. As used herein, the term "matrix" describes a porous structure which is suitable for the absorption of molten alkali carbonate as an electrolyte. Needle-shaped crystals are particularly suitable for the formation of these matrix structures since the crystalline needles result in a fleecelike structure of the matrix which has a high capacity for retention for the molten electrolyte and a great dimensional stability in respect of thermal loads.

BACKGROUND AND PRIOR DEVELOPMENTS

The lithium aluminate used hitherto in fuel cells is produced by annealing of a mixture of aluminum oxide and lithium carbonate. This is shown in French Pat. No. 1 502 000 and German OS No. 2 238 137. This know process is based on a solid state reaction and thus has certain difficulties inherent in this type of reaction; to wit the reaction speed is determined by the diffusion. Therefore, expensive measures are needed for the comminution and mixing of the reactants; i.e., homogenization of the mixture, and long reaction times. These difficulties make the adaptation of the above-mentioned known process to an industrial scale seem unprofitable.

According to another known process described in literature, β-$LiAlO_2$ may be produced by high pressure-high temperature synthesis from lithium peroxide and aluminum oxide. This is described in C. H. Chang, J. L. Margrave, J. Amer. Chem. Soc. Vol. 90, pp. 2020–2022 (1968). This type of production, however, is only of scientific or theoretical interest and, as with the case of the previously mentioned known method, it is unsuitable for utilization on an industrial scale.

A further possibility is to precipitate from an alkaline solution, acid or basic lithium aluminates, for example, of the composition $LiH(AlO_2)_2.5H_2O$. See E. T. Allen, H. F. Rogers, J. Amer. Chem. Soc. Vol. 24 p. 304 (1900) or D. Prociv. Coll. Czech. Chem. Comm. Vol 1, pp. 8,95 (1929). Also, $Li_2O.2Al_2O_3.nH_2O$ may be precipitated as shown in N. P. Kozupalo et al, Redk. Shchelochnye Elem. Sb. Dokl. Vses Sovesch 2nd. Novosibirsk 1964 (publ. 1967) pp. 92–99 or H. A. Horan, J. B. Damiano, J. Amer. Chem. Soc. Vol 57 p. 2434 (1935).

Conversion is carried out by annealing at about 500° C. into α-$LiAlO_2$ and at about 800° C.–900° C. into γ-$LiAlO_2$. In order to arrive at the desired β-modification, the precipitate with the composition $Li_2O.2Al_2O_3.nH_2O$ must first be treated for 7–10 days with a highly concentrated sodium hydroxide solution. The compound $Li_2O.Al_2O_3.nH_2O$ thus obtained may be converted by annealing into β-$LiAlO_2$. See V. A. Kolesova et al, Zh. Neorg. Khim. Vol 12, pp. 3220–3222 (1967) or J. S. Lileev et al, Zh. Neorg. Chim. Vol. 13, pp. 412–416 (1968).

SUMMARY OF THE INVENTION

A process for the production of β-lithium aluminate $LiAlO_2$, is disclosed wherein a lithium hydroxide aluminate of the formula: $Li_2O.Al_2O_3.nH_2O$ is precipitated from aqueous solutions which contain the lithium ions and aluminum in ionogenic or elementary form at a pH value above 7. The concentration of the two metal components is at least 0.1, at most 6 g-atoms per liter, preferably 2 to 5 g-atoms per liter. The precipitation product is washed and dried and then is converted by annealing into β-lithium aluminate, in the temperature range between 200° C. and 800° C., preferably 400° C.–650° C., and especially 450° C.–550° C. The β-$LiAlO_2$ obtained thereby has a lamellae-shaped or fine crystalline form which is converted into a needle-shaped, crystalline lithium aluminate, is obtained by the process of the invention and is suitable for the construction of electrolyte matrices.

DETAILED DESCRIPTION OF THE INVENTION

Figure 1:
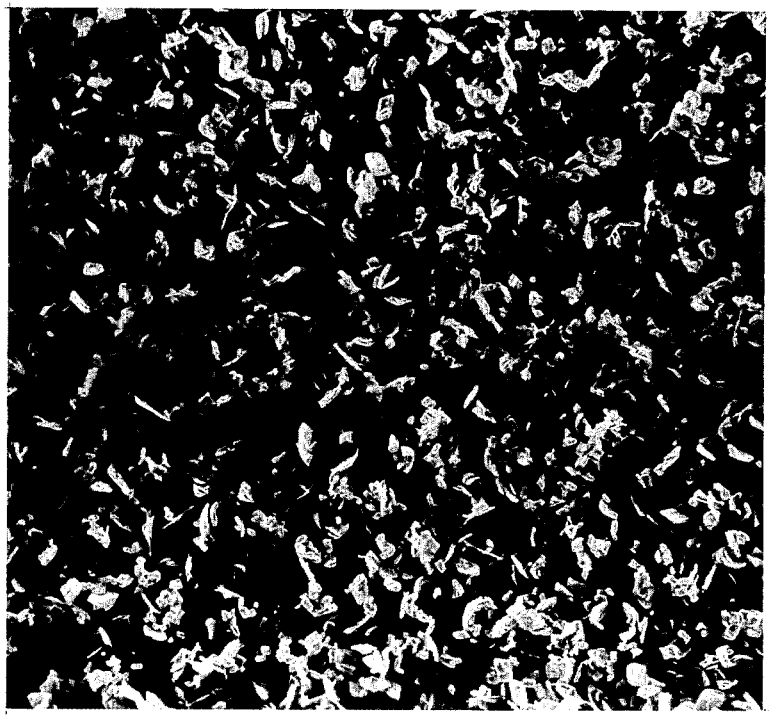

Surprisingly, it has now been found, according to the present invention, that a lithium monoaluminate of the composition $Li_2O.Al_2O_3.nH_2O$ may be precipitated from aqueous solutions which contain lithium ions and aluminum in ionogenic or elementary form at a pH value above 7. In carrying out the process of the present invention, it is possible to add: (1) an aluminum powder or a soluble aluminum salt to an alkaline lithium containing solution, or (2) a lithium salt to an alkali aluminate solution, or (3) alkali hydroxide or ammonia to an aluminum and lithium salt containing solution.

The starting concentrations amount to at least 0.1 g-atom/liter $Al^{3+}$ or $Li^+$, at most 6 g-atoms/liter, preferably 2 to 5 g-atoms/liter. Li and Al are to be present in equimolar ratios or else there should be an excess of Li present.

A feature of the invention resides in a process for the production of β-lithium aluminate which has the formula $LiAlO_2$, wherein a lithium hydroxide aluminate of the composition $Li_2O.Al_2O_3.nH_2O$ is precipitated from aqueous solutions which contain the lithium ions and aluminum in ionogenic or elementary form at a pH value above 7 and at concentrations of the two metal components of at least 0.1, at most 6 g-atoms per liter, preferably 2 to 5 g-atoms per liter, whereby the precipitation product, after washing, is dried and is converted by annealing into β-lithium aluminate, in the temperature range between 200° C. and 800° C., preferably 400° C.–650° C., especially 450° C.–550° C.

The temperature during the precipitation step may be between 20° C. and 100° C., although the range between 40° C. and 60° C. has turned out to be particularly favorable.

The precipitate is filtered off and washed with cold water until no anions of the salts used can be found in the wash water. Subsequently and effectively, the precipitate is rinsed through with twice as much ethyl alcohol as the volume of the deposit.

The preliminary product moist with alcohol is dried between 100° C. and 170° C., preferably at 150° C., and is then annealed (tempered) for at least 2 hours in the temperature range between 200° C. and 800° C., preferably 400° C. and 650° C., especially 450° C.–550° C., and is thereby converted into β-$LiAlO_2$.

It turned out to be favorable to anneal the dried precipitation product for at least 2 hours, and more particularly, at temperatures between 450° C. and 550° C. for about 25 hours.

A particularly favorable variation of the process resides in the fact that the above-described drying and annealing of the precipitation product to form β-lithium aluminate is replaced by a step in the process, wherein the water contained in the precipitation product is exchanged with a volatile, organic liquid miscible with water, which then is removed by expansion (flashed-off) in the hypercritical temperature/pressure range. After that, the moist preliminary product washed, for example, with water, is washed several times with alcohol and is then dispersed in double the quantity of ethanol with reference to the volume of the preliminary product, with an efficient dispersing aggregate, known in the art as Ultraturrax. Any suitable dispersing aggregate may be used for this purpose. After heating this suspension in the autoclave to 320° C. at 65 atu (supercritical state of the ethyl alcohol), the alcohol is removed by a sudden expansion to atmospheric pressure; i.e., by flashing off.

As a result of this treatment one may obtain a β-LiAlO$_2$, which is distinguished by its finely divided state, its narrow distribution of the particle sizes (0.5–4 μm) and the lack of agglomerates.

The β-LiAlO$_2$ obtained by annealing or drying in the supercritical state, in general possesses a lamellae-shaped or fine crystalline (undefined microcrystalline) structure.

As described in the introduction, needle-shaped crystalline structure for lithium aluminate is particularly suitable for the construction of electrolyte matrices. It was now found surprisingly that the lamellae-shaped or fine crystalline structure of β-LiAlO$_2$ may be converted into the desired needle-shaped crystalline structure by tempering in an alkali carbonate melt. Preferably the alkali carbonate melt is Li$_2$CO$_3$/K$_2$CO$_3$ melt of equimolar composition. In carrying out this process, the mixture of the β-LiAlO$_2$ and the alkali carbonate is annealed in a temperature range between about 497° C. and about 800° C., preferably about 550° C. and about 600° C. As for the duration of the annealing operation, one may take as a guideline more than 10 hours, preferably 25 hours at a temperature of 550° C. for annealing. The weight ratio total carbonate to lithium aluminate may at the same time be between 1.5:1 to 3:1, preferably at 2:1, whereby the end product may be further processed into an electrolyte plate of fuel cells.

The invention therefore also extends to the needle-shaped crystalline structure β-lithium aluminate that is obtained according to the process described herein.

Further objects of the invention are the use of the needle-shaped crystalline form of β-lithium aluminate obtained according to the invention, for electrolyte carrier plates in fuel cells as well as the use of the β-lithium aluminate/alkali carbonate mixture obtained during the production of the needle-shaped crystalline β-lithium aluminate, for an electrolyte plate of fuel cells.

Figure 2:
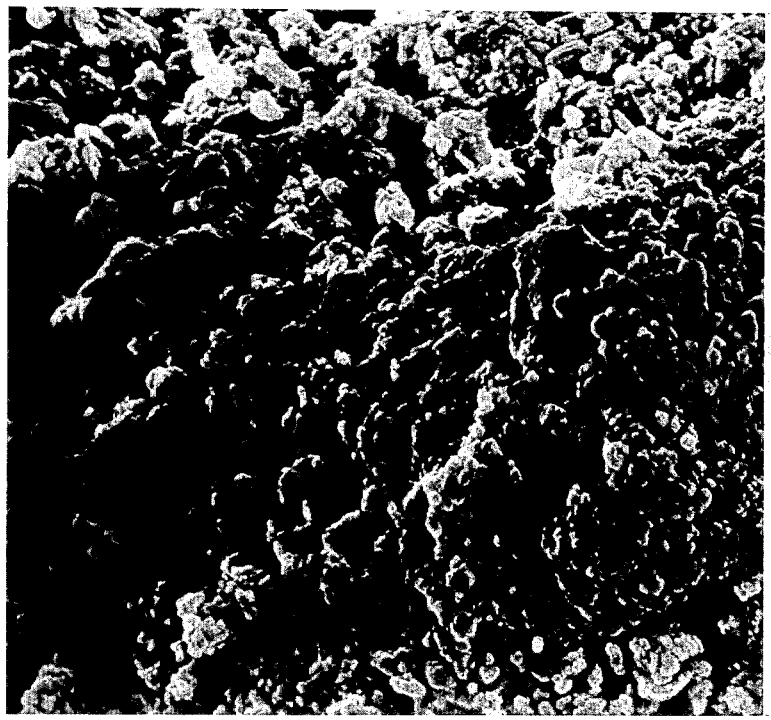
Figure 3:

The invention is described in further detail hereinafter with reference to the specific examples which illustrate the invention and with regard to the drawings; wherein FIG. 1 shows a screen electron microscopic picture (enlargement 1000:1) of the product obtained according to example 16;

FIG. 2 shows a screen electron microscopic picture (enlargement 10,000:1) of the preliminary product used according to example 19; and FIG. 3 shows a screen electron microscopic picture (enlargement 10,000:1) of the final product obtained according to example 19.

EXAMPLE 1

0.26 mole of aluminum powder are added slowly to 200 ml. of a 4.4 molar lithium hydroxide solution at ambient temperature. The resulting suspension is stirred for 1 hours, after precipitation, the deposit is filtered off and is washed with cold water until the wash water shows a pH of about 8. Subsequently, the precipitated product is rinsed through with 250 ml. of ethyl alcohol. The preliminary product moist with alcohol is dried at 150° C. and is annealed for 25 hours at 515° C.

The radiographical (X-ray) analysis shows the structure of β-aluminate is obtained. The particles have a lamellae-shaped form and are strongly aggregated. The Li-Al ratio amounts to 1:1.1.

EXAMPLES 2–4

These examples were carried out following the exact same steps and conditions as in example 1, except where indicated.

| Solution | (mole) LiOH | (mole) Al | (°C.) Precipitation Temperature | Annealing Time (hr) | (°C.) Anneal. Temp. | Structure Li/Al |
|---|---|---|---|---|---|---|
| 200 ml. | 0.88 | 0.26 | 70 | 25 | 500 | β-LiAlO$_2$ 1:0.995 |
| 200 ml. | 0.88 | 0.26 | 100 | 25 | 500 | β-LiAlO$_2$ 1:1.1 |
| 200 ml | 0.36 | 0.36 | 50 | 25 | 500 | β-LiAlO$_2$ 1:1.05 |

These examples show that in the case of the stated precipitation temperatures, the annealed precipitate always has the same desirable radiological (X-ray) structure.

EXAMPLE 5

0.15 moles of aluminum hydroxide acetate are added slowly at 50° C. to 200 ml. of a 2.2 molar lithium hydroxide solution. With ensuing precipitation, the suspension is stirred for 1 hour at 50° C. After precipitation is completed, the deposit is filtered off, and is washed with cold water until no acetate may be found in the wash water. Thereafter, the solids are rinsed through with 250 ml. of ethyl alcohol. Two-thirds of the preliminary product are dired at 150° C. and are annealed for 25 hours at 480° C.

The radiological (X-ray) analysis shows the structure of β-LiAlO$_2$. The molar ratio of Li to Al is 1:1.01. The particles have an undefined, finely distributed form.

EXAMPLE 6

20 g. of Li$_2$CO$_3$ are stirred into 200 ml. of water at 50° C. and subsequently 25 g. of AlCl$_3$.6H$_2$O are dissolved. The suspension is stirred at 50° C. for 2 hours and precipitation proceeds. A pH value between 7 and 8 is obtained. After precipitation, the deposit is filtered off and is washed with cold water and alcohol. Thereafter, if is dried at 150° C. and is subsequently annealed for 30 hours at 550° C.

The radiological (X-ray) analysis shows the structure of β-LiAlO$_2$.

EXAMPLE 7

5 g. of $K_2Al_2O_4.3H_2O$ are dissolved in 100 ml. of water and 5 g. of $Li_2CO_3$ are added to this solution at room temperature. As the precipitation takes place, the suspension is stirred for 2 hours and the precipitated solids are then filtered off, washed with cold water and alcohol. After drying at 100° C., the preliminary product is annealed for 30 hours at 520° C.

The radiological investigation (X-ray analysis) shows the structure of $\beta$-$LiAlO_2$.

EXAMPLE 8

3 g. of LiCl and 20 g. of $AlCl_3.6H_2O$ are dissolved in 200 ml. of water at 50° C. and subsequently 10 g. of NaOh (solid) are added. During the resulting precipitation, the suspension is stirred at 50° C. for 1 hour. The precipitated solids are filtered off, washed with cold water and alcohol and then dried at 150° C. The product is then annealed for 30 hours at 500° C. In the X-ray analysis, the product shows the structure of $\beta$-$LiAlO_2$.

EXAMPLE 9

(Comparative Example)

In order to show that the pH value is an essential parameter in the process for the production of a product of the desired structure, 10 g. of $AlCl_3.6H_2O$ are slowly added to 200 ml. of a 0.22 molar lithium hydroxide solution at 50° C. The resulting suspension which as a pH value of about 4 is stirred at 50° C. for 1 hour. The precipitate which forms is filtered off, washed and is dried at 170° C. The annealing of this preliminary solid product at 500° C. over 42 hours leads to a mixture which according to the radiological (X-ray) analysis consists primarily of $\alpha$-$LiAlO_2$ with little $\beta$-$LiAlO_2$.

EXAMPLES 10-13

Two-thirds of the precipitate obtained in Example 2 are dried at 150° C. and subsequently are annealed for 25 hours at various temperatures.

| 200 | 500 | 730 | 900 | Temperature °C. |
|---|---|---|---|---|
| $\beta$-$LiAlO_2$ | $\beta$-$LiAlO_2$ | $\beta$-$LiAlO_2$ | $\gamma$-$LiAlO_2$ | Radiological (X-ray) analysis of structure |

This shows that the temperature range given according to the invention is another essential parameter in the content of the desired modification.

EXAMPLES 14-15

Two-thirds of the precipitate obtained in example 3 are dried at 150° C. and subsequently one-half is tempered for 2 hours at 200° C. and the other one-half is tempered at 500° C. The radiological (X-ray) analysis in both cases shows $\beta$-$LiAlO_2$. Therefore, even after only 2 hours, the desired modification is formed at the stated temperatures.

EXAMPLE 16

One-third of the moist, preliminary product obtained in example 5 is placed in 80 ml. of ethanol and is dispersed with an Ultraturrax dispersing agent. The resulting suspension is then heated up in an autoclave to 320° C. at 65 atü. After reaching this temperature (supercritical range of the ethanol), this was expanded very quickly to atmospheric pressure for the removal of the alcohol phase by flashing it off.

As a result of this treatment, a $\beta$-$LiAlO_2$ is obtained which is distinguished by its fine dispersion, its narrow distribution range of particle sizes (0.5–4 µm) and a lack of agglomerates (see FIG. 1).

EXAMPLE 17

2 g. of the lamellae-shaped $\beta$-aluminate obtained in example 1 is mixed with 6 g. of an equimolar mixture of $Li_2CO_3$ and $K_2CO_3$ and is annealed for 25 hours at 500° C.

For the microscopic evaluation of the crystal-shape of the $\beta$-lithium aluminate, the $Li_2CO_3/K_2CO_3$ is dissolved out with a mixture of 90 parts acetic acid and 10 parts acetic anhydride. $\beta$-$LiAlO_2$ with a needle structure (length/diameter ratio≃4:1) remains behind.

For industrial purposes, the mixture of $Li_2CO_3/K_2CO_3/\beta$-$LiAlO_2$, obtained after annealing, may be used directly.

EXAMPLES 18-20

For these examples, the procedure according to example 17 is followed:

| 2 g. of material from Example | Time hrs | Form (prelim. product) | $Li_2CO_3/K_2CO_3$ | Form (product) |
|---|---|---|---|---|
| 1(515° C.) annealed | 40 | lamellae-shaped | 4 g. | needle-shaped |
| 5(480° C.) annealed | 40 | undefined finely divided (see FIG. 2) | 6 g. | needle-shaped (see FIG. 3) |
| 5(150° C.) dried | 40 | undefined finely divided | 8 g. | needle-shaped |

The above table shows that for the conversion into needle-shaped crystalline form of $\beta$-$LiAlO_2$ no special form of the preliminary product is required.

EXAMPLE 21

In the case of recrystallizing of $\alpha$-$LiAlO_2$ or $\gamma$-$LiAlO_2$ according to the process stated in example 17, no conversion into a needle-shaped form is observed.

EXAMPLES 22-24

2 g. of $\beta$-$LiAlO_2$ were used in these examples and the procedure followed was as defined in example 17.

| Temperature (°C.) | Time (hr) | Form (prelim. product) | Li CO /K CO | Form (product) |
|---|---|---|---|---|
| 550 | 25 | lamellae-shaped | 6 g. | needle-shaped |
| 500 | 15 | lamellae-shaped | 6 g. | needle-shaped |
| 550 | 10 | lamellae-shaped | 6 g. | lamellae-shaped |

From the above table, it will be seen that a time of more than 10 hours is required for the conversion from lamellae-shape into the needle-shaped crystalline β-lithium aluminate.

We claim:

1. A process for the production of β-lithium aluminate which has the formula: $LiAlO_2$, comprising forming an aqueous solution containing lithium ions and aluminum in ionogenic or elementary form, precipitating a lithium hydroxoaluminate of the composition $Li_2O.Al_2O_3.nH_2O$ wherein n is at least 1 from said aqueous solution at a pH value above 7 and at concentrations of the two metal components of at least 0.1 g-atoms/liter, at most 6 g-atoms per liter, wherein Li and Al are present in equimolar ratios or wherein there is an excess of Li present, washing the product obtained by said precipitating and converting said product by annealing in the temperature range between 200° C. and 800° C. into β-lithium aluminate.

2. The process of claim 1 wherein the concentration of the said metal components is 2 to 5 g-atoms/liter.

3. The process of claim 1 wherein the temperature of annealing is 400° C. to 650° C.

4. The process of claim 1 wherein the temperature of annealing is 450° C. to 550° C.

5. The process of claim 1 wherein the precipitation is carried out at a temperature between 20° C. and 100° C.

6. The process of claim 1 wherein the precipitation is carried out at a temperature between 40° C. and 60° C.

7. The process of claim 1 wherein the precipitation product is dried and is annealed for at least 2 hours.

8. The process of claim 1 wherein the dried precipitation product is dried and annealed at temperatures between 450° C. and 550° C., for approximately 25 hours.

9. The process of claim 1 wherein the water contained in the precipitation product is exchanged for a water miscible, volatile, organic liquid which is then removed by flashing off.

10. The process of claim 1 wherein the β-lithium aluminate obtained is converted into a needle crystalline shape by annealing in an alkali carbonate melt in the temperature range between about 497° C.–800° C.

11. The process of claim 10 wherein the temperature of the annealing in the alkali carbonate melt is about 550° C. to about 600° C.

12. The process of claim 10 wherein the annealing is accomplished at 550° C. for more than 10 hours.

13. The process of claim 12 wherein the annealing is carried out for 25 hours.

14. Needle-shaped crystalline β-lithium aluminate obtained according to the process of claim 10.

* * * * *